US006637471B2

(12) United States Patent
Luehrsen et al.

(10) Patent No.: US 6,637,471 B2
(45) Date of Patent: Oct. 28, 2003

(54) PRECISION DISPENSING (75) Inventors: Robert A. Luehrsen, Libertyville, IL (US); Derek P. Pedraza, Ingleside, IL (US)

(73) Assignee: GFI Innovations, Inc., Libertyville, IL (US)

( * ) Notice: Subject to any disclaimer, the term of this patent is extended or adjusted under 35 U.S.C. 154(b) by 0 days.

(21) Appl. No.: 10/163,713

(22) Filed: Jun. 5, 2002

(65) Prior Publication Data

US 2003/0019885 A1 Jan. 30, 2003

Related U.S. Application Data

(60) Provisional application No. 60/296,017, filed on Jun. 5, 2001.

(51) Int. Cl.[7] ................................................. B65B 1/04
(52) U.S. Cl. ........................... 141/83; 141/94; 141/104; 222/71; 222/144.5; 222/145.5
(58) Field of Search ............................... 141/83, 94, 98, 141/9, 100–104, 2, 18; 222/71, 129, 144.5, 145.1, 145.5

(56) References Cited

U.S. PATENT DOCUMENTS 4,065,032 A * 12/1977 Lydiksen ..................... 222/77
4,096,972 A * 6/1978 Bartels et al. ............... 222/135
5,588,472 A * 12/1996 Johnson ....................... 141/83
6,286,566 B1 * 9/2001 Cline et al. .................. 141/83

* cited by examiner

*Primary Examiner*—Steven O. Douglas
(74) *Attorney, Agent, or Firm*—Banner & Witcoff, Ltd.

(57) ABSTRACT

An automatic hybrid volumetric method of dispensing (HVD) improves on gravimetric dispensing and volumetric dispensing. The method dispenses ingredients for a mixture, according to pre-selected formulations, utilizing a supply of the fluid ingredients, an ingredient container, a power-driven plunger in the ingredient container, a mixture container, and a calibration weight scale. The plunger is movable to expel fluid in the ingredient container. The method includes several steps. The ingredient container is connected to the supply to receive a first ingredient in the ingredient container. The ingredient container is connected to the mixture container for the mixture container to receive ingredient expelled from the ingredient container by movement of the plunger. The method is calibrated by powering the plunger to move in the ingredient container a controlled distance, to expel ingredient to the mixture container, while weighing the increase in the weight of the mixture container, resulting in a calculated rate of weight dispensed per increment of movement of the plunger. The ingredients are dispensed according to the formulations in the weight amounts required by the formulations from the supply through the ingredient container to the mixture container, through calibrated movements of the plunger in the ingredient container.

16 Claims, 4 Drawing Sheets

PRECISION DISPENSING

BACKGROUND OF THE INVENTION

This is a non-provisional application based on provisional application Ser. No. 60/296,017, filed Jun. 5, 2001, for which priority is claimed.

This invention relates to methods and apparatus for the precise dispensing of liquid and fluid ingredients for mixtures and combinations, and more particularly, to precision dispensing in such industries as the paint (and coatings), ink, and cosmetic industries.

Precision dispensing (PD), in its simplest form, is accurately measuring something that resides in one container and transferring it to another. PD is commonly used in the paint and coatings industry, in which color combinations are created to form final paint products.

Paint products are typically derived from combinations of base colors and high-concentrate colorants. The base colors comprise nearly 80–90% of the total formula, while colorants commonly consist of the final 10–20%. The colorants are concentrated in that very small amounts significantly change the final color result. As an example, a gallon container of pure white paint is turned grey with a few drops of concentrated black.

Consumers encounter a basic form of dispensing when they buy paints for the home. If a consumer decided to paint a sunroom yellow, to select the specific yellow color, the consumer would typically choose the color from paint chips available at hardware, home improvement, and paint supply stores. If "Sunrise Yellow" were to be selected, the consumer would hand the "Sunrise Yellow" paint chip to a store clerk to have a gallon or a few gallons mixed, or name the color from the chip. The clerk would typically take a gallon of paint from a shelf, with the gallon having a "base colorant" inside. The gallon container would be almost completely filled. He or she would consult a guide to find the formula for "Sunrise Yellow," open the container, and put the open gallon of base colorant in a dispensing machine, to add the colorants. Following the formula, the clerk would pull some levers on a dispense head, and by doing that, add the necessary colorants to the paint base. The gallon would be resealed and mixed in another machine. This would be done for each gallon. To finish the sale, the clerk would remove the lid, spread a little fresh paint on the chip, blow dry the paint, and ask for customer approval.

The request for approval is significant. By experience, some consumers think the request for approval is insignificant, because they assume the paint in the container they purchase will match the paint chip, since the dispensing and mixing was done by machine. Nevertheless, looking closer at the process, the "Sunrise Yellow" the consumer receives and the "Sunrise Yellow" that the last customer of this color received may be far from the same. The formula for "Sunrise Yellow" might consist of 3.5 Kg of Titanium Dioxide (a common white base), 0.5 Kg Biocide, 0.5 gr. Red Oxide, 4 gr. Yellow, and 0.25 gr. Green. If, as a result of lack of precision in the dispensing machine or the store clerk's use of it, the clerk dispensed 3 gr. Yellow and 0.5 gr. Green, instead of 4 gr. Yellow and 0.25 gr. Green, the color could vary significantly from the paint chip, although not vary much from the formula. The typical machine currently used to produce the paint at the typical home improvement store is only accurate to about 1 gram. As a result, in some instances, the color differences from one gallon of paint to the next, of the "same color," can be quite severe.

This situation—consumer purchase of paints dispensed gallon by gallon—is a very basic one that uses very simple dispensing technology. In most instances, people do not question the results because the color matching is adequate to most untrained eyes, and people do not really understand the basic principles involved in producing their paints. For these reasons the consumer paint store machines do not require much sophistication.

Other situations require much more. For example, in the automobile industry, a gallon of paint will cost on average $80–$90 per gallon. There, the paint specification (spec) is looked at much more closely. In fact the auto manufacturers such as GM, Honda, and Chrysler have very high standards in place that paint manufacturers are required to hold. You can imagine 4000 gallons of paint on a Corvette production line that does not pass spec at a cost of over $320,000; someone might be out of a job at the end of the day. Auto manufacturers can tell if the paint color is correct by a device called a spectrophotometer. This light-measuring instrument uses a laser to detect the color reflection from paint, and can determine exactly what the formulation of the paint is by the spectrum of light it reflects.

In situations that need PD and better technology to dispense paint, two methods are available today: Gravimetric Dispensing (GD), and Volumetric Dispensing (VD). Each will be described in detail in the following sections of this specification. Briefly, gravimetric dispensing relies on weight scales and measures quantities by their weights. Volumetric dispensing relies on volumes and measures quantities by their size. Both methods have numerous deficiencies that slow their speed and decrease their accuracy. GD has deficiencies in dispense valve actuation, dispensing time, accurate reporting, scale cost, effect of vibration and wind currents, pump wear and cost, air fluctuation, and multiple scale cost. Manual VD (MVD) is not really precision dispensing. Automatic VD (AVD) has deficiencies in accuracy, over time, dispense size, dispense speed, and viscosity limitations.

SUMMARY OF THE INVENTION

In a principal aspect, the invention is an automatic hybrid volumetric method of dispensing (HVD) that improves on gravimetric dispensing and volumetric dispensing. The method dispenses ingredients for a mixture, according to pre-selected formulations, utilizing a supply of the fluid ingredients, an ingredient container, a power-driven plunger in the ingredient container, a mixture container, and a calibration weight scale. The plunger is movable to expel fluid in the ingredient container. The method includes several steps. The ingredient container is connected to the supply to receive a first ingredient in the ingredient container. The ingredient container is connected to the mixture container for the mixture container to receive ingredient expelled from the ingredient container by movement of the plunger. The method is calibrated by powering the plunger to move in the ingredient container a controlled distance, to expel ingredient to the mixture container, while weighing the increase in the weight of the mixture container, resulting in a calculated rate of weight dispensed per increment of movement of the plunger. The ingredients are dispensed according to the formulations in the weight amounts required by the formulations from the supply through the ingredient container to the mixture container, through calibrated movements of the plunger in the ingredient container.

BRIEF DESCRIPTION OF THE DRAWING

The preferred embodiment(s) of the invention will be described in the next section in relation to the accompany drawing. The drawing has several figures. Each figure is as follows.

DETAILED DESCRIPTION OF THE PREFERRED EMBODIMENTS

The preferred embodiments of the invention will be better understood in comparison and contrast to a detailed description of gravimetric dispensing and volumentric dispensing. Therefore, these descriptions begin this section of this specification.

Gravimetric Dispensing

Figure 1:
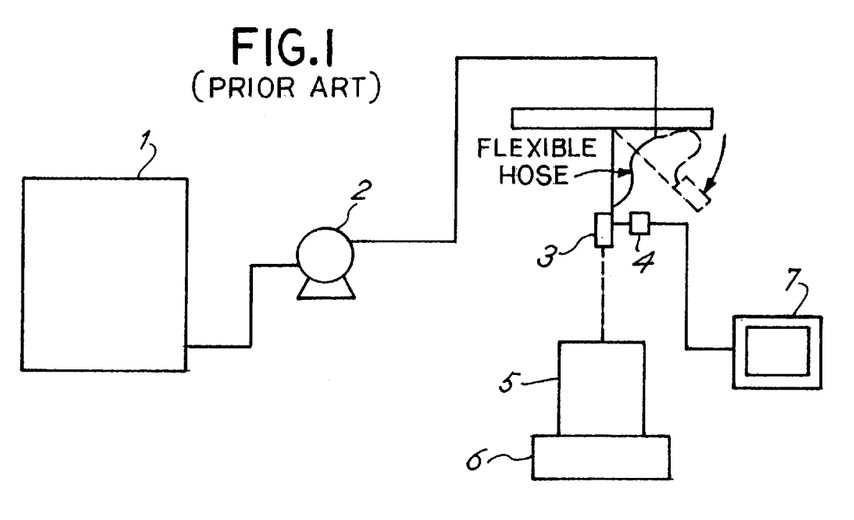
FIG. 1 is a schematic diagram of a GD apparatus.

Gravimetric dispensing relies on precision scales, pumps, computers, solenoid valves, and dispense valves. Formulas are based on target weights of components. With reference to FIG. 1, a final dispense container 5 sits on a precision scale 6. A storage container 1, for each component to be dispensed, is connected to a pump 2 and thereby to a valve 3. A computer 7 controls a solenoid valve 4 in response to a precision weight scale 6. The following steps are involved:

A. The dispense valve 3 is moved into position directly over the final dispense container 5.
B. The computer 7 energizes the solenoid valve 4 which sends an air signal to the dispense valve 3 and opens the valve 3 to its largest opening.
C. The pump 2 starts and pulls product from the storage container 1, which allows product to flow through the dispense valve 3.
D. When product starts to flow through the dispense valve 3 it starts to fill the final container 5, which will add more weight to the container 5.
E. The computer 7 reads the scale 6 and slows down the flow as the weight starts to reach the target value. The computer 7 adjusts the flow from the valve 3 into the container 5 by closing the dispense valve 3 to a smaller opening in the valve 3. Most GD valves 3 have three different opening orifices that allow small, medium, and large flow through the valve 3. The computer 7 may first move close the valve 3 to the medium opening orifice, and then to the small opening orifice.
F. When the dispense valve 3 is on the small opening orifice, the valve 3 opens and closes very quickly in order to reach the target value in spurts or pulses. This is known as "pulse mode," which allows very small drops of the product to be dispensed.
G. Once the computer 7 sees that the target value has been reached, the dispense valve 3 is moved back to its "home" or closed position, and a next component dispense valve will move into "dispense" position and will repeat steps B–F.
H. This process continues for each component in the formula until all components have been added.

Disadvantages with Gravimetric Dispensing

Although GD is a very accurate method to dispense precisely, there are a few problems that exist with this technology. The following is a list of these inherent problems.

1. Dispense Valve Actuation Speed—The dispense valve 3 opens via an electric/pneumatic solenoid valve 4, that the computer 7 controls. This valve 3 must send a pneumatic (air) signal that must physically travel down an air line in order to open the dispense valve 3. This delay affects how fast the dispense valve can physically open and close, therefore, the delay will ultimately affect how long the "pulse" mode will be. This seems like a very minor problem; however, if the effort is to dispense a weight amount of about 0.1 grams it becomes a key component. A standard paper clip for example weighs 2.3 grams.

2. Dispensing Time—Formulas contains multiple components, therefore, it takes time for each component to dispense individually. Not only are there delays due to valves moving in and out of position, there are also scale delays because the scale 6 must have time to stabilize before the valve 3 can dispense more product. The higher the degree of accuracy required, the longer the dispense will take using GD technology.

3. Accurate Reporting—As the dispense valve 3 opens and closes liquids have a tendency to hang up on the edge of the dispense valve 3. When the scale 6 tells the computer 7 that the target value has been reached the computer 7 stops dispensing. The material that hangs up can fall because of gravity. The computer 7 thinks the dispense is over and will not account for the extra material that has just fallen. Thereby, when the computer reports, for example, that 4.755 grams have been dispensed, it would be false, because of material, for example, weighing 0.102 grams. The extra material would take the weight dispensed higher, for example, to 4.857 grams, in reality. For this problem, many manufacturers of GD equipment write their software to lock into the target value so that the reported dispense looks better on paper than in reality.

4. Scale Cost—The scales that are used in GD machines are very expensive, ranging from $1,500–$10,000 per scale. These scale prices add significant expense to the overall cost of a GD machine. It should also be noted that a typical GD machine will be equipped with 2–3 scales per machine, with an average cost of $10,000.

5. Vibration and Wind Currents—The scales used are susceptible to vibration and air movement because of their sensitive load cells. Because the operator is trying to dispense accurately, the scales are often set to read as accurately as possible. If you have any air movement over the scale or any vibration under the scale 6, the scale 6 will read this as weight and relay the information to the computer 7 which thinks that the dispense valve 3 has added more material to the final dispense. In order to alleviate this false reading the computer 7 must give the scale 6 time to stabilize before adding more product. This problem causes large time delays and inaccurate readings to the final dispense.

6. Pump Wear and Cost—Gravimetric machines rely on pumps 2 to transfer product from the storage containers 1 to the dispense valve 3. These pumps 2 cost nearly $400.00 for each paint component, meaning that a typical GD system will have a pump cost of over $6,400. Not only do the pumps add considerable expense to the system, but they also add significant maintenance costs to the end user. It is inherent in the pump design used in these machines that pump maintenance is required often and part replacement is expensive.

7. Air Fluctuation—The air supply required for the pumping system relies on compressed air from the end user of the GD machine. Air compressors are not consistent in the delivery of constant air pressure, which the dispense valve relies on to accurately dispense to the scale. If the air fluctuates too much (15–20 psi), the calibration values that are set in the computer will not be set correctly, and will in turn "over dispense" or "under dispense."

8. Multiple Scale Cost—The reason multiple scales are used is that each scale must be chosen for a specific range that the scale can read. The following chart is a guide for the scales range:

| Scale Model | Scale Capacity | Accuracy | Cost |
| --- | --- | --- | --- |
| 5 Kg | 0–10 pounds | 0.001 gram | $1,000 |
| 32 Kg | 0–64 pounds | 0.1 gram | $2,500 |
| 60 Kg | 0–120 pounds | 0.1 gram | $3,500 |
| 300 Kg | 0–600 pounds | 1 gram | $5,500 |
| 600 Kg | 0–1200 pounds | 2 grm | $7,500 |
| 1500 Kg | 0–3000 pounds | 10 gram | $8,500 |
| 3000 Kg | 0–6000 pounds | 20 gram | $10,000 |

Consider Four Different Scenarios

A. The machine user needs to dispense into 1-gallon containers. Assume the weight of the product is 8 pounds per gallon, so in order to achieve the highest accuracy the 32-Kg scale will be chosen, which has a capacity of 64 pounds and an accuracy of 0.1 gram.

B. Next is a need to dispense into 5-gallon containers with the same product weight. Therefore, a scale with a capacity of 40 pounds (81 bs per gallon×5 gallons=40 pounds) is needed. The 32 Kg scale again suits the need.

C. A need may also exist to dispense into 55-gallon containers that will require a capacity of 440 pounds, so the 300-Kg scale is chosen.

D. The final container that may be required is a 550 gallon bulk tank, which will require 4400 pound capacity, so the 3000 Kg scale would be used.

The above example of four scenarios is very common in a paint manufacture plant in which multiple containers will be utilized for the packaging process. The above example would contribute $18,000 in weight scale expenses to the total machine cost.

It should also be noted that the dispense accuracy decreases as the scale capacity increases. So when a GD manufacturer states that their machine dispenses accurately to 0.1 gram, it should be realized that this is only on small dispenses.

Manual Volumetric Dispensing

Figure 2:
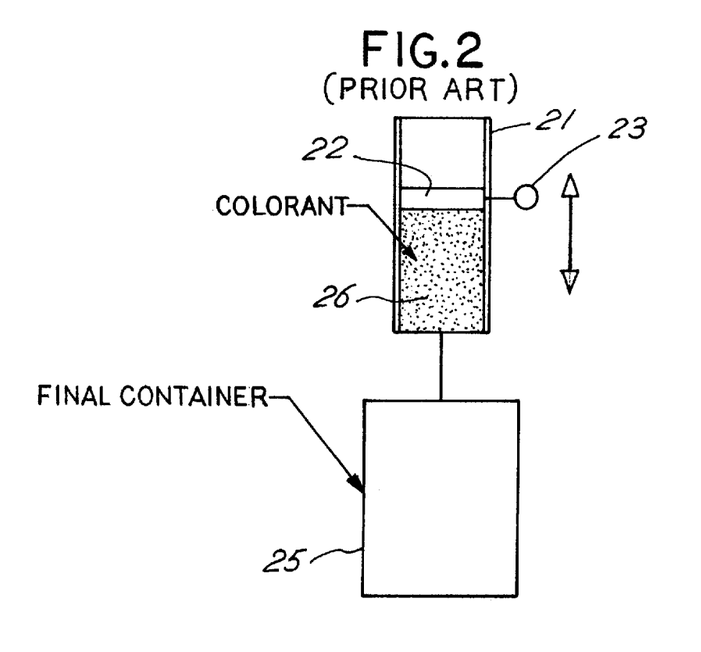
FIG. 2 is a schematic diagram of a manual VD apparatus.

MVD relies on accurately machined containers, plungers, and manual levers. With reference to FIG. 2, the following steps are involved in MVD:

A. The machine operator places the dispense container 25 under the ingredient container 21. The container 25 contains the base components, which have been pre-dispensed.

B. The operator manually pulls the lever 23 up to desired position on the cylinder 22. He manually fills the ingredient container with colorant in area 26 in a volume in proportion to the position of the lever 23.

C. The operator manually pulls down on lever 23, moving plunger 22 to the desired position on cylinder 22, dispensing the volume of colorant between the two positions.

D. Once the operator sees that the colorant has been dispensed in to the container 25, he repeats steps B–C as often as necessary.

Disadvantages with Manual Volumetric Dispensing

MVD requires the least amount of sophistication of any dispensing method and machine available. The lack of sophistication is a result of manual operation. Following is a list of problems that result from this lack of sophistication.

1. Accuracy—MVD is the least accurate dispensing method (1–3 gram accuracy) because it relies on an operator to manually place a lever into position. This is probably the biggest downside to this technology, and it does not really qualify as true "precision dispensing." The operator can be off as little as 1/64 inch and have the machine dispense 1–2 grams more or less product than intended. This can result in a final dispense that is not even close to what is desired.

2. Dispense Size—Because MVD machines do not use pumps, they can only dispense what is available in each dispense container 21. These containers are usually small and must be manually filled when they are low. This problem limits the machine practically to small dispenses.

3. Dispense Speed—The operator must pull each component individually, so that each component must be dispensed separately. If a formula has many components, it will take time to create the final product.

Automatic Volumetric Dispensing

Figure 3:
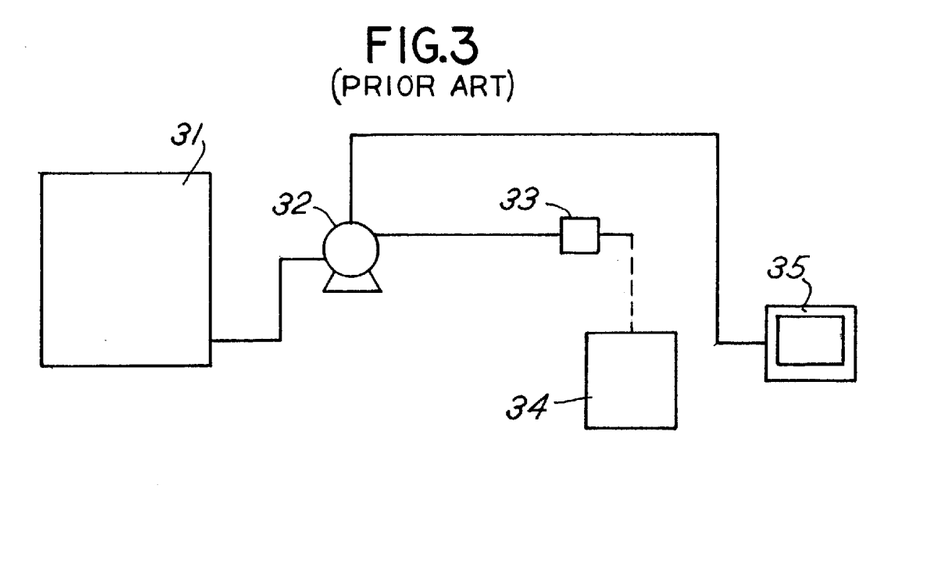
FIG. 3 is a schematic diagram of an automatic GD apparatus.

AVD relies on accurately machined gear pumps, computers, and containers filled with base components. The following steps are involved in AVD, as in FIG. 3:

A. Place container 34 with base components pre-dispensed.

B. Download formula from data base to computer 35.

C. Initiate computer 35 to energize gear pump 32 to draw component from supply 31 into container 34.

D. Repeat steps B–C as necessary.

E. Close container 34 and agitate (mix).

F Open container and check accuracy.

Disadvantages with Automatic Volumetric Dispensing

AVD utilizes a much higher degree of sophistication then MVD; however, there are also limitations to this technology that are presented as follows:

1. Accuracy—AVD is a very accurate dispensing method because it relies on a very accurate gear pump. This pump has a gear that has small pockets or spaces. These pockets are filled with product as the pump rotates. This rotation picks up material and releases the material at the end of each rotation. However, as the pump begins to wear these pockets become larger and will begin to dispense larger amounts of product. By this wear and volume change, accuracy decreases after time, and causes costly maintenance issues as well.

2. Dispense Size—Because AVD machines use these special pumps, they cannot rotate the pump quickly. If the pump rotates too fast, the pump will entrap air which will affect the accuracy. This system is only capable of delivering small quantities of material because of this situation.

3. Dispense Speed—The previous situation also results in final dispense time taking too long to be practical if a large dispense were needed.

5. Viscosity Limitations—The pump used is also limited to dispensing fluid products with a water-like consistency. Heavier inks or paint products cannot be considered with this technology.

Hybrid Volumetric Dispensing

In contrast with the described methods, which are all prior art, this invention proceeds by hybrid volumetric dispensing. The invented HVD relies on a linear ball screw 41, a servo or stepper motor 42, an ingredient container in the form of a precision cylinder 43 with plunger 44, a proportional valve 45, ball valves 46 and a computer 48, all as in FIG. 4.

The Following Steps are Involved in Hybrid Volumetric Dispensing

Figure 4:
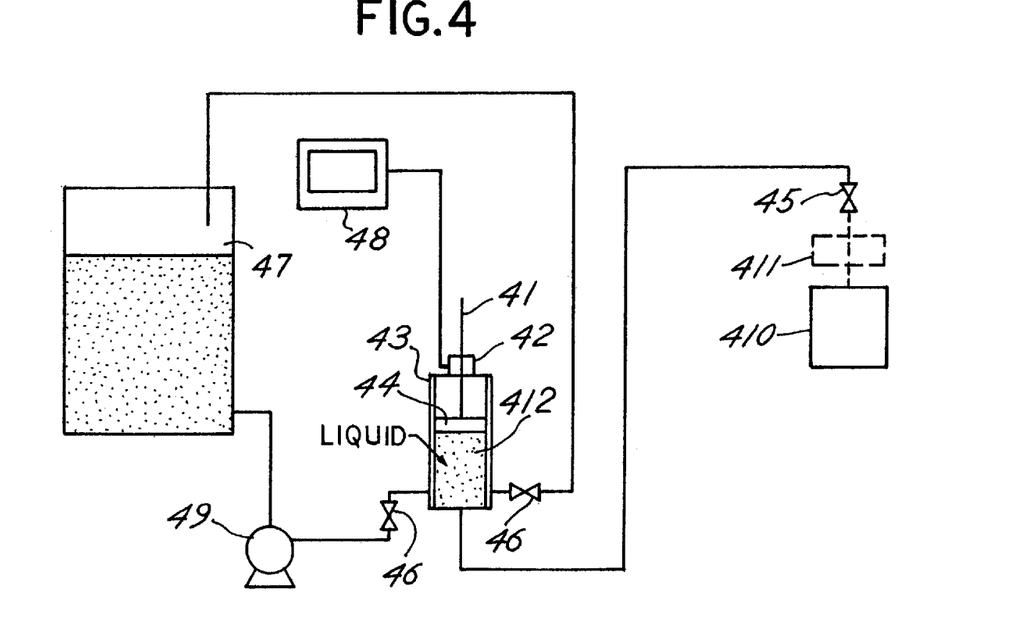
FIG. 4 is a schematic diagram of a preferred apparatus.
Figure 5:
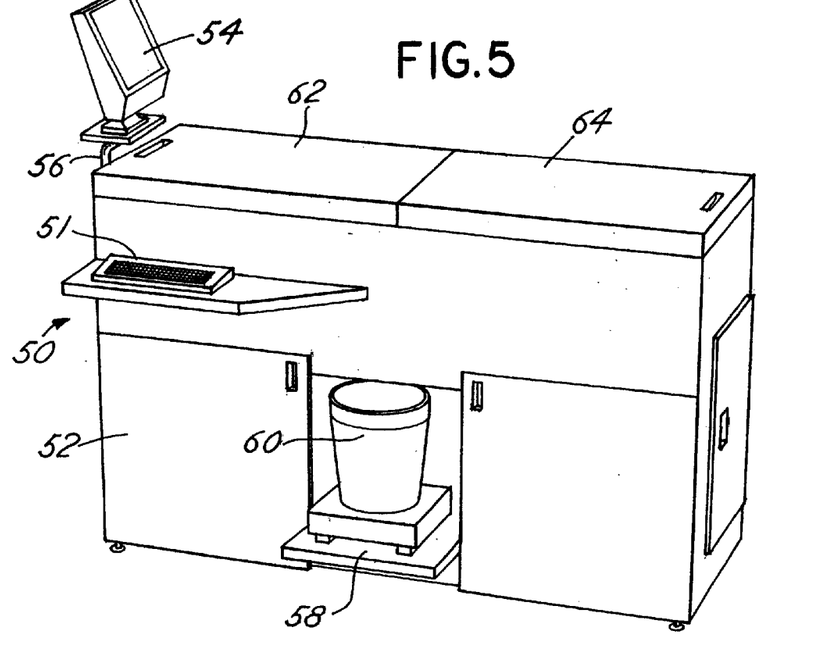
FIG. 5 is a perspective view of a preferred commercial apparatus embodying the invention.
Figure 6:
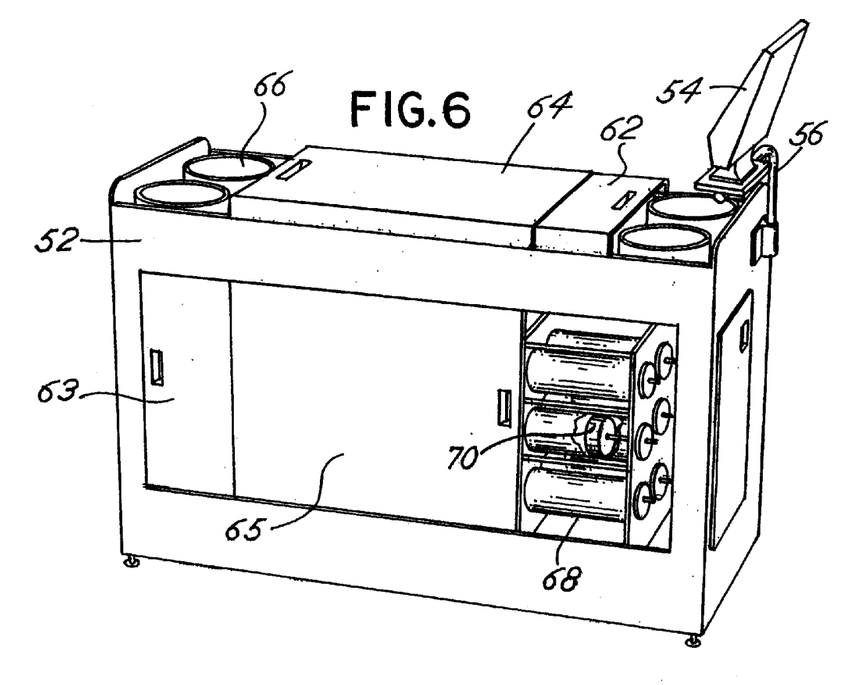
FIG. 6 is a perspective view similar to FIG. 5, from the back of the commercial unit, with portions of the internal structure of the apparatus shown as visible, for illustration.

A. Initially the precision container 43 will be empty. In order to fill the container 43 the computer 48 opens the ball valves 46 to the "fill" position.

B. Next, the storage container 47 is pressurized or the optional pump 49 started.

C. The computer 48 then instructs the servomotor 42 to pull the plunger 44 up. This forms a vacuum in the cylinder 43 and begins to fill the cylinder 43 in the area 412.

D. After the container 43 is full the servomotor 42 is calibrated.

E. Calibration requires that a highly accurate scale 411 be placed under the dispense container 410, while allowing the computer 48 to mathematically calculate how much product is being dispensed by weight, based on known product density. Once calibration is complete, the scale 411 is removed and the computer 48 automatically steps the motor 42 the appropriate amount when a dispense value is desired.

HVD differs from past precision dispensing processes and obviates their disadvantages. Comparisons follow:

1. Accuracy and Speed—First and foremost, other methods and machines are not capable of dispensing components to an accuracy of 0.001 gram or to do so takes other machines a great deal of time, whereas HVD can dispense highly accurately very quickly. HVD will also dispense more accurately due to the fact that once HVD is calibrated, the dispensing tolerance is created by that calibration. Therefore, larger quantities are dispensed in consistent reliance on this tolerance. In contrast, the gravimetric system must rely on larger more inaccurate scales to accomplish larger quantity dispenses.

2. Viscosity Limitations—Because HVD uses a ball screw, energy is transferred very efficiently. This means that the torque capabilities are much greater than in other dispense systems, allowing for dispensing of much higher viscosity components.

3. Drip Control—This is truly a unique advantage over other systems because when a gravimetric or volumetric valve is shut it has a tendency to drip. However, with HVD and a ball screw by simply reversing the ball screw, a vacuum is formed which provides enough suction to overcome dripping.

4. Limited Scales—The gravimetric system relies on scales to dispense larger amounts of liquids. The larger the scale needed, the less accurate they become; conversely, the smaller the scale, the greater the accuracy. Since HVD relies on a very small and accurate scale for calibration the tolerance for dispensing any amount is that of the calibration variable.

5. Small Dispenses—The gravimetric systems cannot deliver small, accurate dispenses because they are subject to the inaccuracy of the scales they use. In most cases gravimetic systems rely on 32 Kg scales for very accurate dispenses. This scale is accurate to 0.1 gr.; however to achieve this accuracy a minimum dispense of 20 grams is required. HVD can dispense 0.01 gr. to the same accuracy as it can dispense 20 gr.

Thus, the invention is an automatic hybrid volumetric method of dispensing (HVD) that improves on gravimetric dispensing and volumetric dispensing. The method dispenses ingredients for a mixture, according to pre-selected formulations, utilizing a supply of the fluid ingredients, an ingredient container, a power-driven plunger in the ingredient container, a mixture container, and a calibration weight scale. The plunger is movable to expel fluid in the ingredient container. The method includes several steps. The ingredient container is connected to the supply to receive a first ingredient in the ingredient container. The ingredient container is connected to the mixture container for the mixture container to receive ingredient expelled from the ingredient container by movement of the plunger. The method is calibrated by powering the plunger to move in the ingredient container a controlled distance, to expel ingredient to the mixture container, while weighing the increase in the weight of the mixture container, resulting in a calculated rate of weight dispensed per increment of movement of the plunger. The ingredients are dispensed according to the formulations in the weight amounts required by the formulations from the supply through the ingredient container to the mixture container, through calibrated movements of the plunger in the ingredient container.

As most preferred, the invention is embodied in commercial structure according to FIGS. 5–8. As in FIG. 5, the preferred commercial structure is a dispensing unit 50 including componentry within a housing 52. A shelf holds a keyboard 51, and the housing 52 is surmounted by a display 54 which may be a flat screen computer monitor on a pivoting post 56. The keyboard 51 and display 54 integrate electronically with a computer in a tower (not shown) within the housing 52. The computer controls plungers in the unit 50, to be described, and a sliding bed 58. The bed 58 receives a product container 60 into which dispensing is to occur.

A variety of doors and panels may be provided, and the unit may include leveling feet. Most preferably, and comparing FIGS. 5 and 6, two top panels 62, 64 slide across each other to reveal and cover, as desired, twelve supply containers, a representative one of which is labeled 66 in FIG. 6. Two side panels 63, 65, on the opposite side from the bed 58, slide across each other to reveal and cover two banks of ingredient containers or cylinders, a representative one of which is labeled 68, and associated piping. Each cylinder includes a piston or plunger as in piston 70. (The cylinder associated with piston 70 is broken away to reveal the piston 70.)

Figure 7:
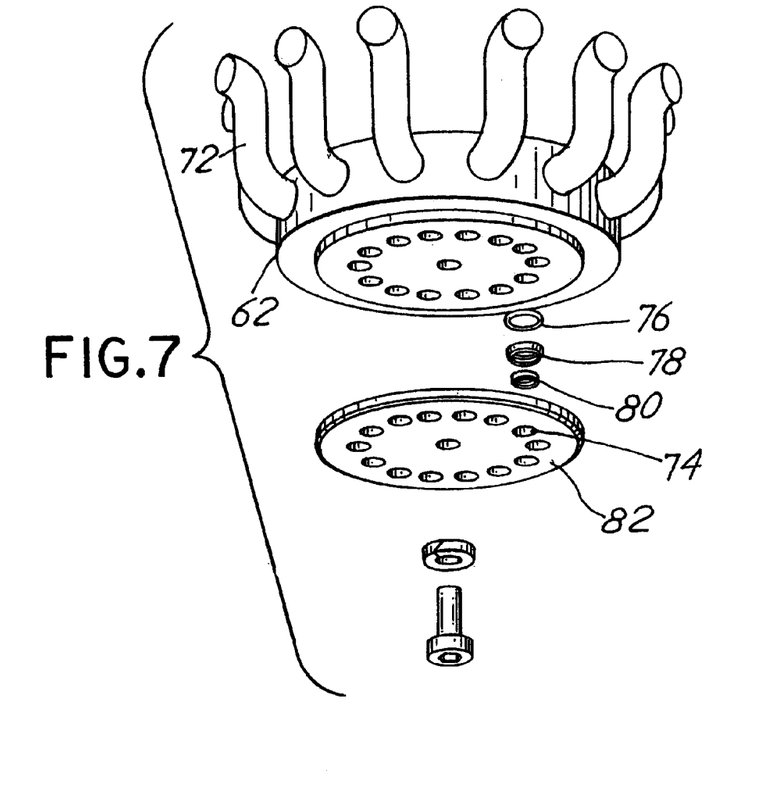
FIG. 7 is an exploded perspective view of a manifold of the embodiment of FIGS. 5 and 6 from below.

Referring to FIG. 7, dispensing into the product container 60 occurs through a manifold 62, from the supply containers 66 and through the ingredient cylinders 68 under action of the pistons 70, and under control of the computer, with manual input. The manifold includes twelve input conduits, one for each container 66. A representative input conduit is marked 72. Outflow from the conduits 72 is through the twelve openings in the bottom of the manifold, one being marked 74, and into the product container 60. As apparent, the manifold is above the product container 60 when the container 60 is on the bed 58 and the bed is slid into position in the housing 52. Each supply container 66 has an associated cylinder 68, each cylinder 68 has an associated conduit 72, and each conduit 72 has an associated opening 74. Dispensing from multiple ingredient containers occurs simultaneously through the associated cylinders, conduits and manifold openings, for speed. Selection among the supply containers, ingredient cylinders, conduits and openings is by computer control based on stored and/or input formulation.

The passage leading to each manifold opening 74 includes a seal 76, a valve holder 78, and a dispensing valve 80, all held to the manifold by a fastened bottom plate 82.

Each dispensing valve 80 is most preferably a pressure responsive one-way valve. The valve opens when the force and pressure of liquid on it forces it open, and closes effectively and most preferably completely when the force and pressure drops. Silicone valves which open and close in response to predetermined discharge force are preferred. These valves include valve heads 82 that shift outward (downward in FIG. 8) to cause a connector sleeve 84 to double over and extend rollingly, to thereby apply a torque to the valve head 82 which assists in opening the valve orifice 86. On release of force, the orifice 86 closes and the valve head 82 shifts to a retracted position. Suitable valves are made by Liquid Molding Systems, Inc. under the trademark SureFlo, and U.S. Pat. Nos. 5,439,143 issued Aug. 8, 1995, 5,339,995 issued Aug. 23, 1994, and 5,213,236 issued May 25, 1993 are understood to describe these valves. The identified patents are incorporated by reference.

Figure 8:
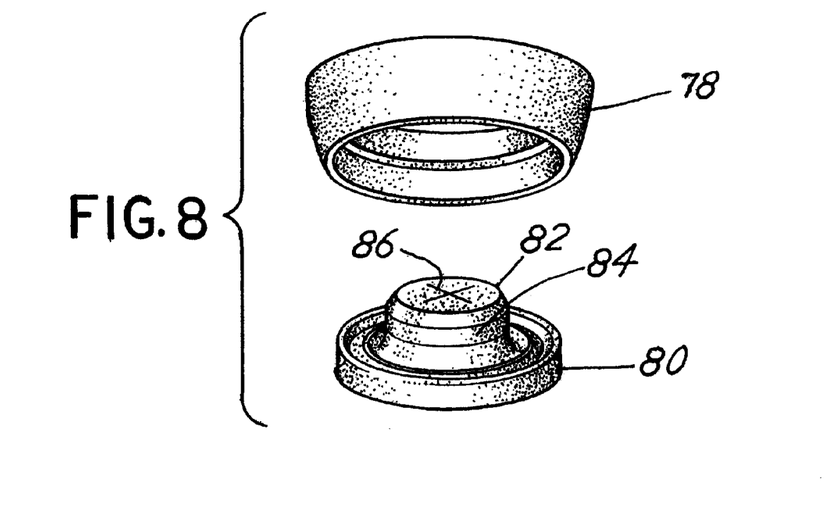
FIG. 8 is a view of a representative valve as most preferred for inclusion in the manifold of FIG. 7.

The process of dispensing in the commercial unit relies upon the stepper or servomotor to push the piston 70 to a precise position within the cylinder 68. As the piston 70 moves through the cylinder pressure builds within the chamber of the cylinder 68. This internal pressure will open a dispensing valve, preferably valve 80. This valve accomplishes two goals. First, the valve operates very consistently in that the system will displace fluid in a very repeatable fashion due to pressure correlation. When the pressure in the cylinder 68 reaches a certain level the valve opens. When the pressure in the cylinder 68 drops the valve closes. There is also another advantage in that on closing, the valve positively stops the flow of material. The valve cuts the fluid if there are any "stringing" characteristics such as those found in latex paint, cutting any "strings." In some cases where "stringing" is not a problem the identified valves may not be needed, however, it appears to be an important component to dispensing accurately and repeatably in most cases.

The preferred embodiments of the inventions are now described in such full, clear and concise terms as to enable a person of skill in the art to which it pertains to make and use the same. The best mode contemplated by the inventors for carrying out the invention is also set forth. To particularly point out and distinctly claim the subject matter regarded as invention, the following claims conclude this specification. Variations and additions to the described preferred embodiments are possible, and are to be understood to be within the scope of the claims where appropriate and the law allows.

What is claimed is:

1. An automatic hybrid volumetric method of fluid ingredient dispensing for a mixture, according to pre-selected formulations, utilizing a supply of the fluid ingredients, an ingredient container, a power-driven plunger in the ingredient container, the plunger movable to expel fluid in the ingredient container, a mixture container, and a calibration weight scale, the method comprising the steps of:

connecting the ingredient container to the supply to receive a first ingredient in the ingredient container;

connecting the ingredient container to the mixture container for the mixture container to receive ingredient expelled from the ingredient container by movement of the plunger;

calibrating the method by powering the plunger to move in the ingredient container a controlled distance, to expel ingredient to the mixture container, while weighing the increase in the weight of the mixture container, resulting in a calculated rate of weight dispensed per increment of movement of the plunger; and dispensing the ingredients required by the formulations in the weight amounts required by the formulations from the supply through the ingredient container to the mixture container, through calibrated movements of the plunger in the ingredient container.

2. An automatic hybrid volumetric method of fluid ingredient dispensing for a mixture as in claim 1, further utilizing a valve, and further comprising dispensing the ingredients from the ingredient container through the valve to the mixture container.

3. A method as in claim 2 utilizing a pressure responsive one-way valve, and comprising dispensing the ingredients from the ingredient container through the pressure responsive one-way valve to the mixture container.

4. A method as in claim 3 utilizing a silicone valve which opens and closes in response to predetermined discharge force.

5. An automatic hybrid volumetric method of fluid dispensing for a mixture as in claim 1, utilizing a ball screw connected to the plunger, and further comprising driving the ball screw to cause the calibrated movements of the plunger in the ingredient container.

6. A method as in claim 5 utilizing a stepper motor, and further comprising driving the stepper motor to drive the ball screw.

7. An automatic hybrid volumetric fluid ingredient dispensing apparatus, for dispensing for a mixture, according to pre-selected formulations, utilizing multiple supply containers of the fluid ingredients, and ingredient containers, the apparatus comprising:

multiple power-driven plungers in the ingredient containers, the ingredient containers connected to the supply containers for passage of ingredients from the supply containers to the ingredient containers, the plungers movable to expel fluid from the ingredient containers;

a mixture container to receive ingredients expelled from the ingredient containers by movement of the plungers;

a calibration weight scale; and means for controlling the plungers for cylinder movement according to inputs of selected quantities of ingredients according to the formulations;

whereby the apparatus is calibrated by powering each plunger to move in its associated ingredient container a controlled distance, to expel an ingredient to the mixture container, while weighing the increase in the weight of the mixture container, resulting in a calculated rate of weight dispensed per increment of movement of each plunger; and whereby dispensing of the ingredients required by the formulations in the weight amounts required by the formulations from the supply through the ingredient containers to the mixture container is provided through calibrated movements of the plungers in the ingredient containers.

8. An automatic hybrid volumetric apparatus as in claim 7 further comprising valves for dispensing the ingredients from the ingredient containers through the valves to the mixture container.

9. An apparatus as in claim 8 in which the valves are pressure responsive one-way valves.

10. An apparatus as in claim 8 in which the valves are silicone valves which open and close in response to predetermined discharge forces.

11. An automatic hybrid volumetric dispensing apparatus as in claim 7 further comprising ball screws connected to the plungers, the means for controlling for driving the ball screws to cause the calibrated movements of the plungers in the ingredient containers.

12. An automatic hybrid volumetric method of fluid ingredient dispensing for a mixture, according to pre-selected formulations, utilizing a supply of the fluid ingredients, ingredient containers, power-driven plungers in the ingredient containers, the plungers movable to expel fluid from the ingredient containers, a mixture container, and a calibration weight scale, the method comprising the steps of:

connecting the ingredient containers to the supply to receive first ingredients in the ingredient containers;

connecting the ingredient containers to the mixture container for the mixture container to receive ingredients expelled from the ingredient containers by movement of the plungers;

calibrating the method by powering each plunger to move in its associated ingredient container a controlled distance, to expel an ingredient to the mixture container, while weighing the increase in the weight of the mixture container, resulting in a calculated rate of weight dispensed per increment of movement of each plunger; and dispensing the ingredients required by the formulations in the weight amounts required by the formulations from the supply through the ingredient containers to the mixture container, through calibrated movements of the plungers.

13. An automatic hybrid volumetric method of fluid ingredient dispensing for a mixture as in claim 12, further utilizing valves, and further comprising dispensing the ingredients from the ingredient containers through the valves to the mixture container.

14. A method as in claim 12 utilizing pressure responsive one-way valves, and comprising dispensing the ingredients from the ingredient containers through the pressure responsive one-way valves to the mixture container.

15. A method as in claim 14 utilizing silicone valves which open and close in response to predetermined discharge forces.

16. An automatic hybrid volumetric method of fluid dispensing for a mixture as in claim 12, utilizing ball screws connected to the plungers, and further comprising driving the ball screws to cause the calibrated movements of the plungers in the ingredient containers.

* * * * *